(12) United States Patent
Kayastha et al.

(10) Patent No.: US 11,615,238 B2
(45) Date of Patent: Mar. 28, 2023

(54) TECHNOLOGIES FOR MODIFYING DESIGN TEMPLATES ACROSS ONLINE SERVICES

(71) Applicant: CIMPRESS SCHWEIZ GMBH, Winterthur (CH)

(72) Inventors: Christina Kayastha, Cambridge, MA (US); Brian Hanechak, Arlington, MA (US)

(73) Assignee: CIMPRESS SCHWEIZ GMBH, Winterthur (CH)

( * ) Notice: Subject to any disclaimer, the term of this patent is extended or adjusted under 35 U.S.C. 154(b) by 0 days.

(21) Appl. No.: 17/233,239

(22) Filed: Apr. 16, 2021

(65) Prior Publication Data

US 2021/0326521 A1  Oct. 21, 2021

Related U.S. Application Data

(60) Provisional application No. 63/010,995, filed on Apr. 16, 2020.

(51) Int. Cl.

| G06F 3/048 | (2013.01) |
| G06F 40/186 | (2020.01) |
| G06F 16/532 | (2019.01) |
| G06F 16/9538 | (2019.01) |
| G06F 3/04817 | (2022.01) |

(Continued)

(52) U.S. Cl.
CPC .......... *G06F 40/186* (2020.01); *G06F 3/0482* (2013.01); *G06F 3/04817* (2013.01); *G06F 3/04845* (2013.01); *G06F 3/04847* (2013.01); *G06F 16/532* (2019.01); *G06F 16/9538* (2019.01)

(58) Field of Classification Search
CPC .. G06F 40/186; G06F 16/532; G06F 16/9538; G06F 3/04817; G06F 3/0482; G06F 3/04845; G06F 3/04847
See application file for complete search history.

(56) References Cited

U.S. PATENT DOCUMENTS

| 6,185,587 | B1 * | 2/2001 | Bernardo | G06F 40/166 |
| | | | | 707/E17.112 |
| 7,194,678 | B1 * | 3/2007 | Koike | G06F 16/972 |
| | | | | 709/224 |

(Continued)

OTHER PUBLICATIONS

International Application No. PCT/IB2021/053176, International Search Report and Written Opinion, dated Jun. 15, 2021.

*Primary Examiner* — Nicholas Augustine
(74) *Attorney, Agent, or Firm* — Marshall, Gerstein & Borun LLP

(57) ABSTRACT

Systems and methods for automatically generating digital designs according to search queries. According to certain aspects, an electronic device may present a first template associated with a first online service, and a second template associated with a second online service. The electronic device may facilitate a search using inputted keywords, and identify a set of images and/or design elements according to the search. The electronic device may modify the first template and/or the second template by incorporating various of the images and/or design elements. A user may select different functionalities associated with the modified templates, including selecting digital design for an online service, such as a social media site and/or an online video conferencing site.

20 Claims, 10 Drawing Sheets

(51) Int. Cl.
*G06F 3/0482* (2013.01)
*G06F 3/04845* (2022.01)
*G06F 3/04847* (2022.01)
*G06F 3/01* (2006.01)

(56) References Cited

U.S. PATENT DOCUMENTS

| | | | | |
|---|---|---|---|---|
| 7,458,021 | B2* | 11/2008 | Balasubramanyan | G06F 40/186 715/236 |
| 8,799,829 | B2* | 8/2014 | Grosz | G06F 3/04845 709/219 |
| 8,812,423 | B1* | 8/2014 | Kurniawati | G06F 21/6218 706/47 |
| 10,007,943 | B2* | 6/2018 | Naficy | G06T 11/60 |
| 10,337,879 | B2* | 7/2019 | Mendels | G01C 21/3484 |
| 11,048,387 | B1* | 6/2021 | Srinivasan | G06Q 10/10 |
| 2001/0049671 | A1* | 12/2001 | Joerg | G06F 16/951 706/50 |
| 2003/0233425 | A1* | 12/2003 | Lyons | H04L 67/02 709/217 |
| 2009/0099938 | A1* | 4/2009 | Harris | G06Q 30/0601 705/26.1 |
| 2009/0265607 | A1* | 10/2009 | Raz | G06F 16/957 709/217 |
| 2010/0023863 | A1* | 1/2010 | Cohen-Martin | G06Q 30/0601 705/26.1 |
| 2011/0161178 | A1* | 6/2011 | Rosenstein | G06Q 30/0273 705/14.69 |
| 2013/0117151 | A1* | 5/2013 | Macaisa | G06Q 50/01 705/26.8 |
| 2013/0145257 | A1* | 6/2013 | Shalabi | G06F 40/106 715/243 |
| 2014/0075385 | A1* | 3/2014 | Wan | H04W 4/029 715/812 |
| 2014/0143252 | A1* | 5/2014 | Silverstein | G06Q 10/105 707/809 |
| 2014/0331124 | A1 | 11/2014 | Downs et al. | |
| 2015/0007022 | A1 | 1/2015 | Chen et al. | |
| 2015/0120357 | A1* | 4/2015 | Tuchman | G06Q 10/063114 705/7.15 |
| 2015/0154676 | A1* | 6/2015 | Matousek | G06F 3/04842 705/26.5 |
| 2015/0317750 | A1* | 11/2015 | Benhuri | H04L 65/1073 705/319 |
| 2016/0267087 | A1* | 9/2016 | Mowatt | G06F 16/248 |
| 2017/0078621 | A1* | 3/2017 | Sahay | G06F 40/131 |
| 2017/0116581 | A1* | 4/2017 | Shah | G06Q 10/1097 |
| 2018/0246983 | A1* | 8/2018 | Rathod | G06F 16/9566 |
| 2018/0300305 | A1* | 10/2018 | Lam | G06Q 10/101 |
| 2018/0336175 | A1* | 11/2018 | Heie | G06F 40/186 |
| 2019/0065613 | A1 | 2/2019 | Bilsten | |
| 2021/0126883 | A1* | 4/2021 | Choi | G06F 3/0484 |

* cited by examiner

500

START

↓

505 DISPLAY, IN A USER INTERFACE: (I) A FIRST TEMPLATE FOR A DIGITAL DESIGN, THE FIRST TEMPLATE ASSOCIATED WITH A FIRST ONLINE ACCOUNT, AND (II) A SECOND TEMPLATE FOR THE DIGITAL DESIGN, THE SECOND TEMPLATE ASSOCIATED WITH A SECOND ONLINE ACCOUNT, EACH OF THE FIRST TEMPLATE AND THE SECOND TEMPLATE HAVING (I) A DEFAULT IMAGE, AND (II) A SET OF DEFAULT DESIGN ELEMENTS

↓

510 RECEIVE, VIA THE USER INTERFACE, AT LEAST ONE SEARCH TERM

↓

515 IDENTIFY, BASED ON THE AT LEAST ONE SEARCH TERM, AN IMAGE AND A SET OF DESIGN ELEMENTS

↓

520 RETRIEVE, VIA THE USER INTERFACE, A SELECTION FOR AT LEAST A PORTION OF THE SET OF DESIGN ELEMENTS

↓

525 DETERMINE A DOMINANT COLOR OF THE IMAGE

↓

530 REPLACE, IN EACH OF THE FIRST TEMPLATE AND THE SECOND TEMPLATE, THE DEFAULT IMAGE WITH THE IMAGE

↓

535 REPLACE, IN EACH OF THE AT LEAST A PORTION OF THE FIRST TEMPLATE AND THE SECOND TEMPLATE, AT LEAST A PORTION OF THE SET OF DEFAULT DESIGN ELEMENTS WITH AT LEAST THE PORTION OF THE SET OF DESIGN ELEMENTS

↓

540 APPLY, IN EACH OF AT LEAST THE PORTION OF THE FIRST AND SECOND TEMPLATES, THE DOMINANT COLOR OF THE IMAGE TO AT LEAST ONE OF THE IMAGE AND AT LEAST THE PORTION OF THE SET OF DESIGN ELEMENTS

↓

545 ADD TEXTUAL CONTENT TO EACH OF AT LEAST THE PORTION OF THE FIRST AND SECOND TEMPLATES

↓

550 DISPLAY THE MODIFIED FIRST TEMPLATE AND THE MODIFIED SECOND TEMPLATE

↓

END

TECHNOLOGIES FOR MODIFYING DESIGN TEMPLATES ACROSS ONLINE SERVICES

CROSS-REFERENCE TO RELATED APPLICATIONS

This application claims priority to U.S. Patent Application 63/010,995 filed Apr. 16, 2020, the disclosure of which is hereby incorporated by reference in its entirety.

FIELD

The present disclosure is directed to improvements in digital design using electronic devices. More particularly, the present disclosure is directed to platforms and technologies to automatically generate digital designs using design elements determined from search queries.

BACKGROUND

In the modern world, many people frequently use online services, such as social media sites, for a variety of purposes. For example, a person may use an online service to make an announcement that an event has been postponed (e.g., due to the outbreak of COVID-19). However, currently, to make such an announcement via an online service, the user will have to manually design a post for the announcement, which can be tedious and time consuming. Furthermore, if the person desires to make the announcement on multiple online service sites, the person will have to manually design the post for each online service site separately, which is even further cumbersome.

The techniques of the present disclosure address these problems and others.

SUMMARY

In an embodiment, a computer-implemented method of automatically generating digital designs is provided. The method may include: displaying, in a user interface: (i) a first template for a digital design, the first template associated with a first online account, and (ii) a second template for the digital design, the second template associated with a second online account, wherein each of the first template and the second template comprises (i) a default image, and (ii) a set of default design elements, and wherein the first template has a first format and the second template has a second format different than the first format; receiving, by a computer processor via the user interface, a search term; identifying, based on the search term, an image and a set of design elements; and modifying the first template and the second template displayed in the user interface by replacing, in each of first template and the second template, at least one of (i) the default image with the image, or (ii) at least a portion of the set of default design elements with at least a portion of the set of design elements.

In another embodiment, a system for automatically generating digital designs for a product from a template is provided. The system may include a user interface for displaying content, a memory storing non-transitory computer executable instructions, and a processor interfacing with the user interface and the memory. The processor may be configured to execute the non-transitory computer executable instructions to cause the processor to: cause the user interface to display (i) a first template for a digital design, the first template associated with a first online account, and (ii) a second template for the digital design, the second template associated with a second online account, wherein each of the first template and the second template comprises (i) a default image, and (ii) a set of default design elements, and wherein the first template has a first format and the second template has a second format different than the first format; receive, via a user interface, at least one search term; identify, based on the at least one search term, an image and a set of design elements; and cause the user interface to modify the first template and the second template displayed in the user interface by replacing, in each of first template and the second template, at least one of (i) the default image with the image, or (ii) at least a portion of the set of default design elements with at least a portion of the set of design elements.

In a further embodiment, a non-transitory computer-readable storage medium configured to store instructions is provided. The instructions, when executed by a processor, may cause the processor to perform operations comprising: displaying, in a user interface: (i) a first template for a digital design, the first template associated with a first online account, and (ii) a second template for the digital design, the second template associated with a second online account, wherein each of the first template and the second template comprises (i) a default image, and (ii) a set of default design elements, and wherein the first template has a first format and the second template has a second format different than the first format; receiving a search term; identifying, based on the search term, an image and a set of design elements; and modifying the first template and the second template displayed in the user interface by replacing, in each of first template and the second template, at least one of (i) the default image with the image, or (ii) at least a portion of the set of default design elements with at least a portion of the set of design elements.

BRIEF DESCRIPTION OF THE FIGURES

FIG. 5 depicts an example flow diagram associated with automatically generating a digital design, in accordance with some embodiments.

DETAILED DESCRIPTION

Figure 1A:
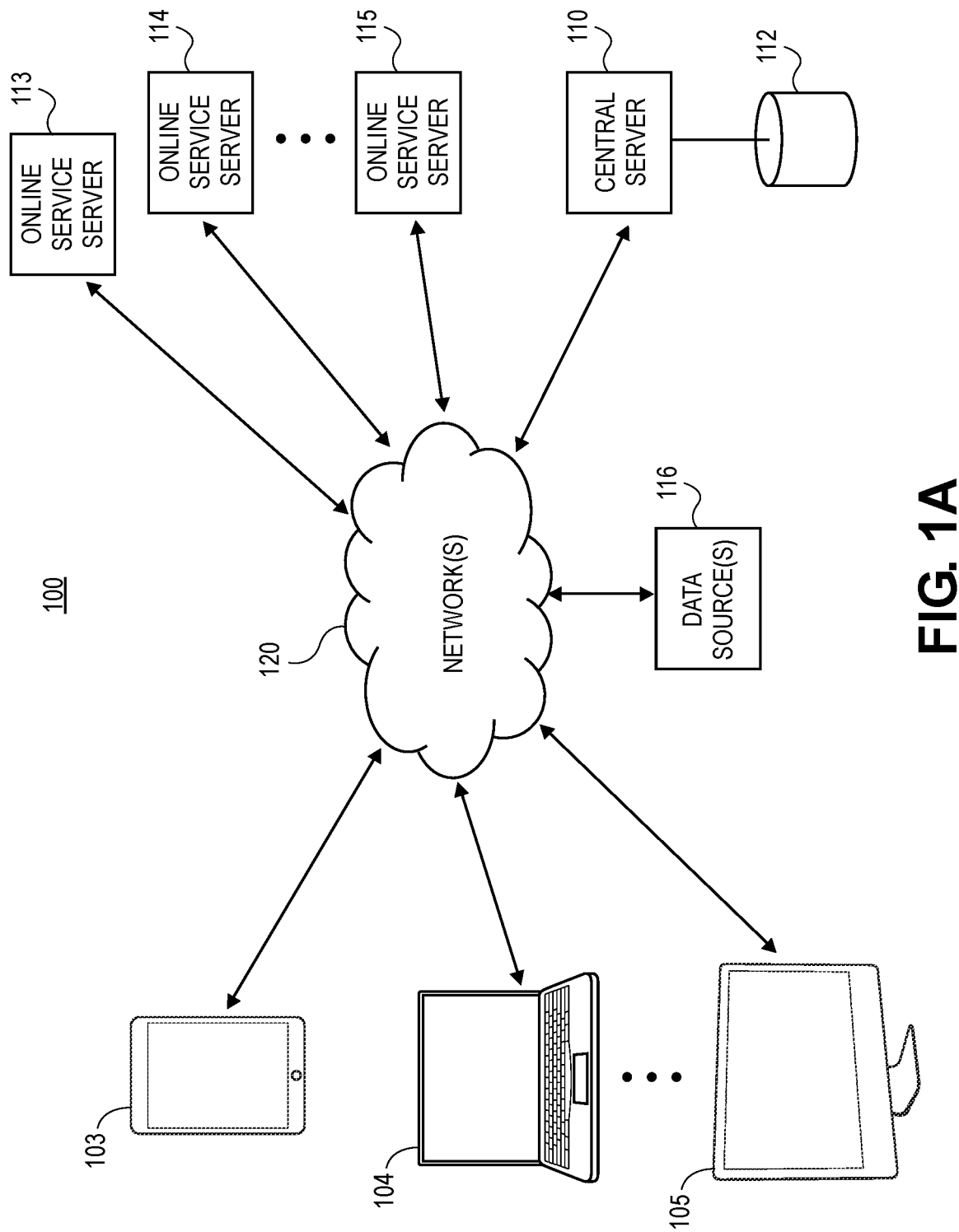
FIG. 1A depicts an overview of components and entities associated with the systems and methods, in accordance with some embodiments.

The present embodiments may relate to, inter alia, platforms and technologies for dynamically generating digital designs (e.g., designs for a social media post, designs for backgrounds for an online video conference, etc.) based on templates and containing various graphical and/or textual content. According to certain aspects, an individual or customer may use an electronic device to input a query containing terms desired for a digital design, and the electronic device may facilitate generation of one or more product designs according to the query and based on one or more established templates.

To generate the digital designs, systems and methods may determine a set of design elements based on the inputted query, where the set of design elements may be graphical content (e.g., images and logos) or textual content. In an implementation, the systems and methods may interface with one or more data sources to identify or determine the set of design elements. In embodiments, an individual may input design elements (e.g., graphical or textual content) to add to the product designs. The systems and methods may further determine how to modify or align the design elements according to the templates and/or based on other factors. In one scenario, the systems and methods may determine a color, a dominant color, or a color scheme from one or more of the design elements (e.g., an image), and apply that color, dominant color, or color scheme to one or more the design elements. Additional modifications and alignments are envisioned. The terms "components," "elements," and "design elements" may be used interchangeably throughout this description.

The systems and methods therefore offer numerous benefits. In particular, the dynamic product design generation results in the ability for customers to review and select from multiple design options, where the customers may experience greater flexibility and ease, and less frustration, in designing custom products. Additionally, the systems and methods generate digital designs that have aesthetically-pleasing and consistent elements, resulting from an analysis of one or more design elements included in the product designs. Moreover, in some aspects, companies or entities may offer physical items for sale based on the digital designs, and according may experience increased sales. Further advantageously, in some embodiments, digital designs may be used across multiple online accounts, thus saving the user time. It should be appreciated that additional benefits are envisioned.

The systems and methods discussed herein address a challenge that is particular to e-commerce and online services. In particular, the challenge relates to a difficulty in accurately and effectively creating and modifying digital designs across a plurality of online services. For instance, digital designs with the same or similar look and feel may be created across a plurality of online services. This advantageously increases efficiency. Conventionally, a user manually creates a digital design by manually manipulating elements of the design. However, this conventional method is often time consuming, ineffective, and/or expensive. The systems and methods offer improved capabilities to solve this problem by dynamically and automatically generating digital designs according to search queries, interfacing with data sources, and using existing templates. Further, because the systems and methods employ communication between and among multiple devices, the systems and methods are necessarily rooted in computer technology in order to overcome the noted shortcomings that specifically arise in the realm of e-commerce.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of electronic devices 103, 104, 105, each of which may be operable by a user (not shown in FIG. 1A). The user(s) may be any individual or person who may be interested in creating a digital design. Each of the electronic devices 103, 104, 105 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like.

The electronic devices 103, 104, 105 may communicate with a central server 110 via one or more networks 120. The central server 110 may be associated with the entity that owns and/or manages the e-commerce platform(s) and/or the set of brick-and-mortal retail stores. In particular, the central server 110 may include or support a web server configured to host a website that offers various products and/or services for purchase by users. Further, the central server 110 may support a software application executable by the set of electronic devices 103, 104, 105 (i.e., the set of electronic devices 103, 104, 105 may interface with the central server 110 in executing the software application). In embodiments, the network(s) 120 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

Although depicted as a single central server 110 in FIG. 1A, it should be appreciated that the server 110 may be in the form of a distributed cluster of computers, servers, machines, or the like. In this implementation, the entity may utilize the distributed server(s) 110 as part of an on-demand cloud computing platform. Accordingly, when the electronic devices 103, 104, 105 interface with the server 110, the electronic devices 103, 104, 105 may actually interface with one or more of a number of distributed computers, servers, machines, or the like, to facilitate the described functionalities.

The central server 110 may be configured to interface with or support a memory or storage 112 capable of storing various data, such as in one or more databases or other forms of storage. According to embodiments, the storage 112 may store data or information associated with products or services that are offered for sale by the entity that owns and/or manages the e-commerce platform and/or the set of brick-and-mortal retail stores. For example, the storage 112 may store information associated with office supplies such as business cards and notepads, including information associated with a customer or client (e.g., company name and logo). For further example, the storage 112 may store templates of digital designs, as well as information associated with the designs, including properties of the elements/components of the designs.

For even further example, the storage 112 may store information associated with the formats for digital designs supported by the online services of the set of online service servers 113, 114, 115, including properties and dimensions of the elements/components of the digital designs. It should be appreciated that the central server 110 and the set of electronic devices 103, 104, 105 may interface with the set of online service servers 113, 114, 115 to access and retrieve the formats for the digital designs.

The system 100 may further include a set of data sources 116, where the central server 110 and/or the electronic devices 103, 104, 105 may interface with and retrieve information from the set of data sources 116 via the network(s) 120. The data source(s) 116 may be implemented as storage or as a platform including various hardware and software components. In particular, one of the data sources 116 may be a multimedia database that stores graphical content such as images, videos, icons, stylized text, and/or the like, and another of the data sources 116 may be a social networking service that may at least partially store data associated with users or entities registered with the social networking service. For example, if a business is registered or otherwise has an account with the social networking service, the social networking service may store the following information associated with the business: owner/proprietor, address, logo(s), phone number, color scheme, and/or other information that identifies or describes the business. It should be appreciated that alternative and additional data sources, platforms, and/or the like are envisioned.

The system 100 may further include a set of online service servers 113, 114, 115, each of which may configure, support, and/or manage an online service for which a user may create and maintain an account, or otherwise interface with using the electronic devices 103, 104, 105. Each online service may enable a user to create, upload, save, and/or share digital designs, where each online service may or may not be a social networking service that enables users to connect with each other, "follow" each other, or otherwise associate with each other, as well as share and/or send electronic communications (e.g., digital designs or other communications) with each other. For example, an online service may be a social networking service that enables a user to upload a profile picture and/or a cover photo, share a image post on a feed, share a temporary post or "story", and/or facilitate other electronic communications. Each of the online services may have different interfaces, layouts, formats, and the like for digital designs. For example, a first digital design (e.g., a digital image) for a first online service may be of a first format, and a second digital design for a second online service may be of a second, different format.

Although three (3) electronic devices 103, 104, 105, three (3) online service servers 113, 114, 115, one (1) server 110, and one (1) data source 116 are depicted in FIG. 1A, it should be appreciated that greater or fewer amounts are envisioned. For example, there may be multiple central servers and/or multiple data sources, each one associated with a different entity.

Figure 1B:
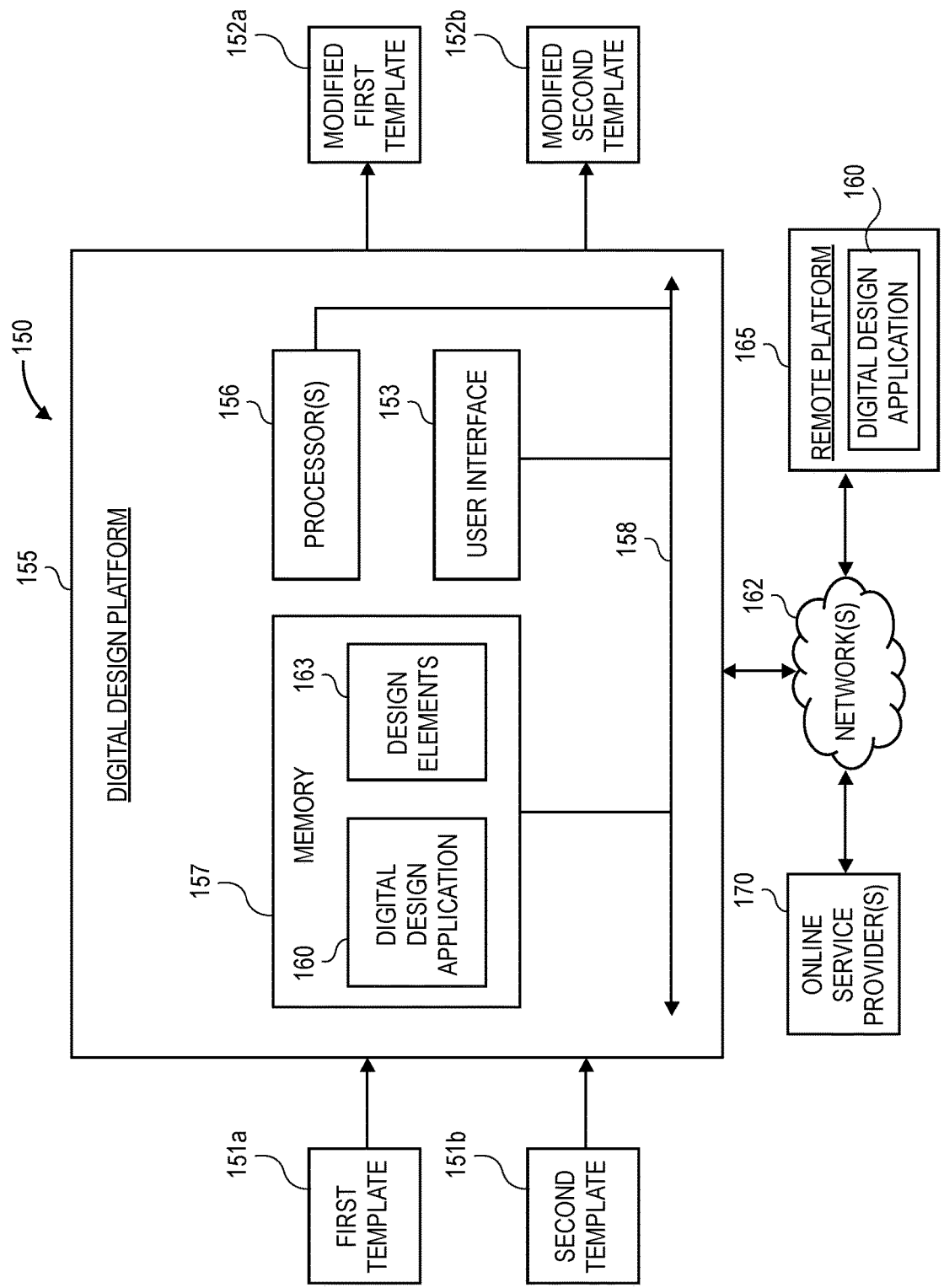
FIG. 1B depicts an overview of certain components configured to facilitate the systems and methods, in accordance with some embodiments.

According to embodiments, the user(s) may use the electronic devices 103, 104, 105 to facilitate the design of products based on a template(s), such as in contemplation of placing an order for a product(s). The product design(s) may include a set of design elements, each of which has a characteristic or property (e.g., as defined by metadata). The users(s) may use the electronic devices 103, 104, 105 to input a search query, from which a desired set of design elements may be determined. The electronic devices 103, 104, 105 and/or the central server 110 may facilitate generation of the product design(s) by modifying the template(s) to add or replace certain default design elements with the desired design elements that conform to or are associated with the intended use of the product(s). The user(s) may then use the electronic devices 103, 104, 105 to review the product design(s) and/or facilitate an order(s) for the product(s) according to any selected product design(s). FIG. 1B depicts more specific components associated with the systems and methods.

According to embodiments, users of the electronic devices 103, 104, 105 may select a digital design(s) to create and/or modify using the electronic devices 103, 104, 105, such as in contemplation of sending, sharing, or posting on one or more online services. The digital design(s) may include at least one digital image or video in various file formats (e.g., JPEG, TIFF, GIF, PNG, Raw, MP4, MOV, etc.), where the digital image(s) or video(s) may depict visual content (i.e., the design itself) that may be composed of one or more design elements. The users may use the respective electronic devices 103, 104, 105 to modify certain of the design elements across one or more formats. When a particular digital design is complete, the user may select to send, share, or post on the appropriate online service, where multiple versions of the digital design (e.g., the digital design in different formats) may be respectively shared across multiple online services. FIG. 1B depicts more specific components associated with the systems and methods.

FIG. 1B illustrates an example environment 150 in which, via a digital design platform 155a, first template for a digital design 151a is processed into a modified first template for a digital design 152a, and second template for a digital design 151b is processed into a modified second template for a digital design 152b. The digital design platform 155 may be implemented on any computing device, including one or more of the electronic devices 103, 104, 105, or the server 110 as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156. In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The digital design platform 155 may further include a user interface 153 configured to present content (e.g., designs and components/elements thereof). Additionally, a user may make selections to the content via the user interface 153, such as to view or modify designs (or design elements thereof) presented thereon, input queries, and/or make other selections. The user interface 153 may be embodied as part of a touchscreen configured to sense touch interactions and gestures by the user, or otherwise a display configured to present content. Although not shown, other system components communicatively coupled to the system bus 158 may include input devices such as cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., a digital design application 160) data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The digital design platform 155 may operate in a networked environment and communicate with one or more remote platforms, such as a remote platform 165, via a network 162, such as a local area network (LAN), a wide area network (WAN), or other suitable network. The platform 165 may be implemented on any computing device, including one or more of the electronic devices 103, 104, 105, or the server 110 as discussed with respect to FIG. 1A, and may include many or all of the elements described above with respect to the platform 155. In some embodiments, as will be described herein, the digital design application 160 as will be further described herein may be stored and executed by the remote platform 165 instead of by or in addition to the platform 155. The digital design platform 155 may further, via the network 162, be in communication with online service server(s) 170 (such as the online service servers 113, 114, 115 of FIG. 1A).

According to embodiments, the digital design platform 155 (and more particularly, the digital design application 160) may process or modify the first template 151a to produce the modified first template 152a; and process or modify the second template 151b to produce the modified second template 152b. It should be understood that, as used herein, the modified first template 152a and modified second template 152b may also be referred to as a "digital designs." It should also be understood that, although only the first template 151a and second template 151b are shown in FIG. 1B, the example environment 150 may be configured to process or modify any amount of templates to generate multiple amounts of modified templates. Each of the original templates (e.g., the first template 151a and second template 151b) and the modified templates (e.g., the modified first template 152a, and modified second template 152b) may be embodied as any type of electronic document, file, template, etc., that may include a set of design elements or components, each of which may be some type of displayable content (e.g., a combination of textual and/or visual content).

The memory 157 may further store design elements 163 accessible to the digital design application 160. According to embodiments, the digital design application 160 may process the first template 151a and/or the second template 151b by modifying, deleting, inserting, and/or replacing certain of the set of design elements included in the first template 151a and/or the second template 151b. Each of the design elements included in the first template 151a, the second template 151b and/or in the design elements 163 may have associated metadata that may define how the corresponding design element is to be presented within the first template 151a and/or the second template 151b and/or modified based on a modification(s) to another design element(s). Additionally, the digital design application 160 may determine how any design element(s) should correspondingly modify according to the metadata of the design element(s). In embodiments, the templates 151a, 151b, 152a, 152b, the design elements, and the metadata thereof may be implemented using any type of file format. For example, the metadata may be in JavaScript Object Notation (JSON) format, or another format(s).

The user may input a search query (e.g., via alphanumeric input, voice input, etc.) via the user interface 153, which may cause the digital design application 160 to retrieve certain design elements based on the search query, and generate the modified first template 152a, and modified second template 152b. The digital design application 160 may cause the modified first template 152a, modified second template 152b and design elements thereof to be displayed on the user interface 153 for review by the user. In embodiments, the templates 151a, 151b, 152a, 152b may be stored in memory as program data in a hard disk drive, magnetic disk and/or optical disk drive in the digital design platform 155 and/or the remote platform 165. The design processing and modification techniques discussed herein are illustrated in certain of the following figures.

Figure 2:
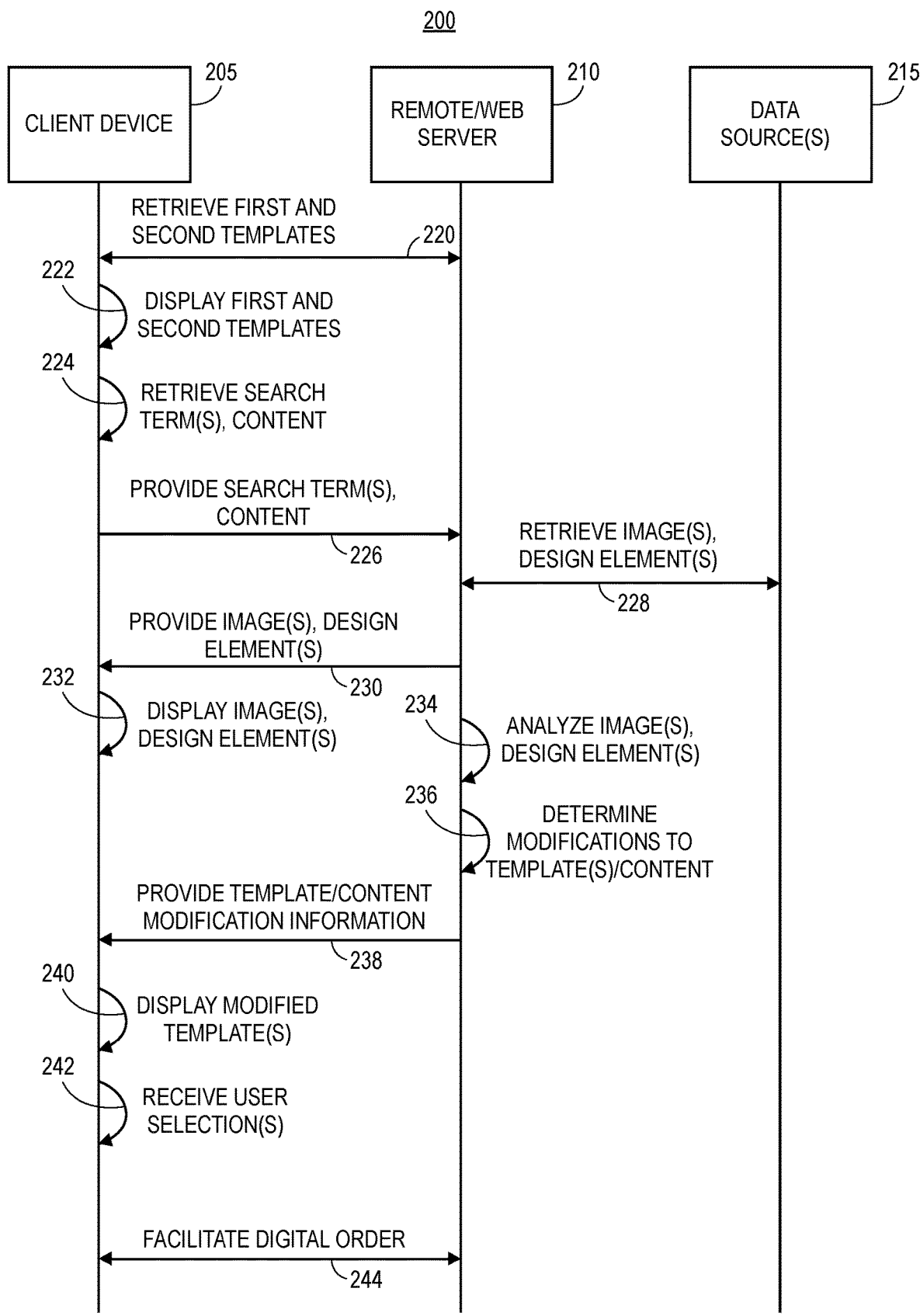
FIG. 2 is a signal diagram associated with automatically generating digital designs using design elements determined from a search query, in accordance with some embodiments.

FIG. 2 depicts a signal diagram 200 associated with automatically modifying templates of digital designs. The signal diagram 200 includes a client device 205 (such as one of the electronic devices 103, 104, 105 as discussed with respect to FIG. 1A), a remote/web server 210 (such as the central server 110 as discussed with respect to FIG. 1A), and data source(s) 215 (such as one of the data source(s) 116 as discussed with respect to FIG. 1A). According to embodiments, the server 210 may support a website (e.g., a digital design website and/or product design website) or an application that is accessible by the client device 205 via a network connection, where a user of the client device 205 may use the client device 205 to make selections associated with the website. Further, the data source(s) 215 may be any multimedia database configured to store various digital images, videos, textual content, and/or other content.

The server 210 may connect to and interface with the image database 215 via an application programming interface (API) or other interface. In an implementation, the data source(s) 215 may be embodied within or separate from the server 210. For example, the data source(s) 215 may be part of a remote server that may connect to the server 210 via a network connection. The data source(s) 215 may store protected and/or public domain digital images and/or design elements, where the digital images and/or design elements may be sorted, classified, categorized, and/or the like. It should be appreciated that the server 210 may interface with multiple data source(s) 215.

It should be appreciated that the functionalities performed by the various components are exemplary, and that additional or alternative functionalities are envisioned. Further, although FIG. 2 depicts certain functionalities being performed by certain of the components, it should be appreciated that another of the components may perform the certain functionalities. For example, some of the analysis and determination functionalities as depicted as being performed by the server 210 may additionally or alternatively be performed by the client device 205 (e.g., by an application executing on the client device 205).

The signal diagram 200 may begin when the client device 205 retrieves (220), from the server 210, a first template (e.g., first template 151*a*) and a second template (e.g., second template 151*b*). In embodiments, the client device 205 may access the website supported by the server 210, and a user of the client device 205 may use the client device 205 to make certain selections associated with retrieving the first and second templates. For example, the user may select to view templates associated with a restaurant business (i.e., a category of templates). As another example, a default set of templates may be retrieved from the server 210. It should be appreciated that different templates may be associated with different businesses, uses, products, categories, and/or the like, where the website may organize or categorize the templates accordingly. In addition, although the example of FIG. 2 is illustrated with respect to two templates (i.e., the first template and the second template), it should be understood that any number of templates may be used.

After retrieving the set of templates, the client device 205 may display (222) the first and second templates for review by the user. In embodiments, the user may use the client device 205 to make certain selections associated with the set of templates, such as to view certain details of the set of templates, zoom in or out, and view different angles or sides of the set of templates. In some embodiments, each of the set of templates may include a default image and a set of default design elements. In particular, the default image may be a background image or pattern, a stock image, or the like; and the set of default design elements may include certain stock or default designs, motifs, logos, representations, textual content, and/or the like. In other embodiments, each of the first and second templates may include a default image or a set of default design elements.

The client device 205 may receive (224), via a user interface of the client device 205, a search term(s) and/or content that may be associated with a modification or redesign of the set of templates. In embodiments, the search term(s) and/or content may be associated with a desired modification to one or more of the first and second templates. In particular, the search term may be representative of an intended use of a digital design and/or product associated with the first and second templates, and the content may be visual and/or textual content that the user may wish to include in the digital design. For example, a user may input "florist" and "orchid" as two search terms, and may input an address, a phone number, and a name as textual content. A user may input the search term(s) and the content via an appropriate interface(s) of the website, and may use various input channels or techniques (e.g., voice input, mouse/keyboard input, predictive terms, etc.). It should be appreciated that the client device 205 may receive, via the user interface, various amounts of search terms and items of content. It should be further appreciated that the client device 205 may receive just the search term(s), just the content, or a combination of both.

The client device 205 may provide (226) the search terms(s) and the content to the server 210 via the network connection, such as in response to the client device 205 receiving, via the user interface, a "search" selection (or similar selection) made by the user of the client device 205. The server 210 may retrieve (228), from the image database 215, an image(s) and a design element(s) according to at least the search term(s). In particular, the server 210 may query (e.g., via an API) the image database 215 for image(s) and design element(s) that may be representative of the search term(s). For example, if the search terms are "florist" and "orchid," a representative image may depict a flower presentation and a representative design element may be a motif of an orchid. It should be appreciated that various amounts of representative images and/or representative design elements may be retrieved from the image database 215.

The server 210 may provide (230) the image(s) and design element(s) to the client device 205. After receipt, the client device 205 may display (232) the image(s) and the design element(s) for review by the user of the client device 205. According to embodiments, the user may use the client device 205 to make certain selections associated with the image(s) and the design element(s), such as "favoriting" or removing one or more of the image(s) and/or design element(s), viewing additional details associated with the image(s) and/or design element(s), facilitating an additional search for additional image(s) and/or design element(s) based on the same or additional search term(s), and or other functionalities.

The server 210 (or in some cases, an application executing on the client device 205) may analyze (234) the image(s) and/or the design element(s). In an embodiment, the server 210 may analyze an image to determine a dominant or prominent color that exists in the image (and optionally determine a color palette from the image, where the color palette may include two or more prominent colors). As used herein, a dominant color of an image is the color (or color shade) that is most prominent in an image, where the server 210 may determine the dominant color (or color palette) using various techniques, calculations, or by interfacing with a third party service.

Additionally or alternatively, the server 210 may analyze an image to determine various metrics associated with the image, such as contrast level, brightness, hue, saturation, intensity, RGB color makeup, and/or others. Additionally or alternatively, the server 210 may compare a contrast level of the image and/or design elements to a contrast level of the content provided to the server 210 in (226), and may determine whether to modify the content. In particular, the server 210 may determine whether a difference in contrast levels meets or exceeds a threshold level, and if so, may determine to apply a formatting (e.g., bold) to the content in an effort to increase the visibility and legibility of the content. It should be appreciated that other image analysis techniques and calculations are envisioned.

The server 210 (or in some cases, an application executing on the client device 205) may determine (236) a set of modifications to the templates, such as at least in part based on the analysis of (234) the images and/or design elements. In embodiments, one of the modifications to a template may be to replace the default image of the template with the image retrieved from the image database 215. For example, the server 210 may replace a stock background image with an image of a flower presentation. Another of the modifications of the template may be to replace at least a portion of the set of default design elements with at least a portion of the design element(s) retrieved from the data source(s) 215. For example, the server 210 may replace a circle icon with a motif of an orchid. An additional of the modifications of the template may be to apply the determined dominant color of an image to the image (e.g., as a hue) and to at least a portion of the set of design elements (e.g., as a hue). For example, if the dominant color of an image of a flower presentation is pink, then the server 210 may apply a pink hue to the image and to a motif of an orchid.

The server 210 may also compare metrics associated with the content provided in (226) to metrics associated with the image(s) retrieved from the image database 215. In a scenario, the server 210 may compare the contrast level of the content to the contrast level of an image to determine if a threshold is met or exceeded. If the threshold is met or exceeded (i.e., the difference in contrast levels is larger), the server 210 may refrain from modifying the content. Conversely, if the threshold is not met or exceeded (i.e., the difference in contrast levels is smaller), the server 210 may determine to modify the content. In particular, if the content is textual content, the server 210 may apply a bold formatting to the text, adjust the color or contrast of the text, or facilitate another modification.

The server 210 may provide (238) information associated with modification of the templates and content to the client device 205. After receiving the information, the client device 205 may display (240) the templates according to the received modification information. In particular, the client device 205 may display, for each template, the default image of the template replaced with the image retrieved from the data source(s) 215, at least a portion of the set of default design elements replaced with at least a portion of the design element(s) retrieved from the image database 215, and/or the determined dominant color of an image applied to the image (e.g., as a hue) and to at least a portion of the set of design elements (e.g., as a hue). Additionally or alternatively, the client device 205 may display, for each template, any content received in (224), where the content may or may not be modified based on the determination of (236).

The client device 205 may further receive (242) a set of user selections associated with the displayed content and/or functionality related thereto. For example, the website or application may support users ordering digital designs according to the displayed templates, where the users may select a template from which to order a digital design, a desired size and quantity of the digital design, delivery information (e.g., to an email address, online account, etc.), payment information, and/or other selections. The client device 205 may further facilitate (244) a digital design order with the server 210. In particular, the client device 205 may transmit selections associated with the digital design order to the server 210, and the server 210 may facilitate an order of the digital design according to the selections. For example, the server 210 may post the ordered digital design to the user's online account (e.g., by sending the digital design directly to the server of an online service site, such as the online service server(s) 170 of FIG. 1B).

Figure 3:
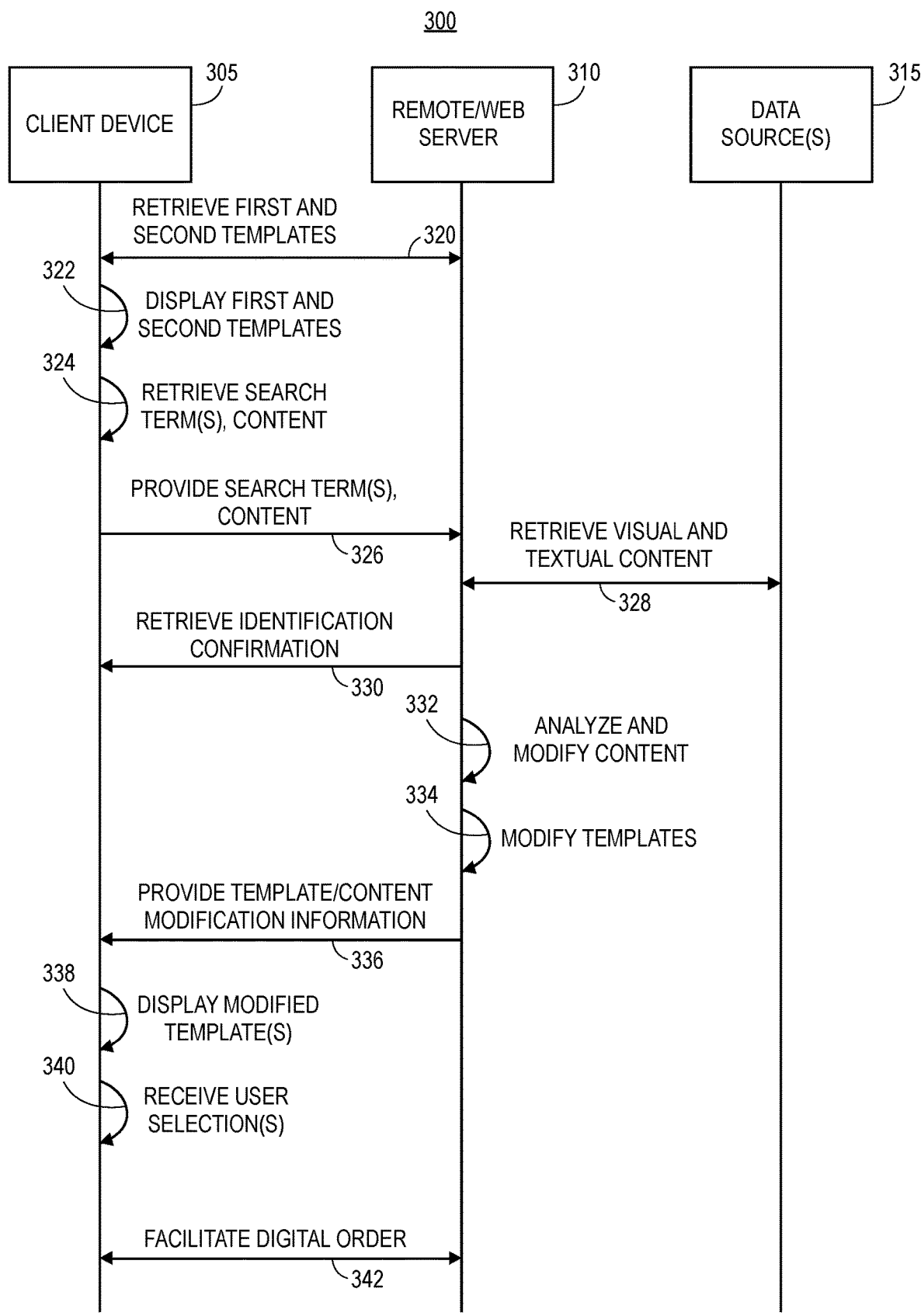
FIG. 3 is a signal diagram associated with automatically generating product designs using design elements determined from interfacing with a data source, such as by retrieving information from a profile or account, in accordance with some embodiments.

FIG. 3 depicts a signal diagram 300 associated with automatically modifying templates of digital designs. The signal diagram 300 includes a client device 305 (such as one of the devices 103, 104, 105 as discussed with respect to FIG. 1A), a remote/web server 310 (such as the central server 110 as discussed with respect to FIG. 1A), and a data source(s) 315 (such as the data source(s) 116 as discussed as discussed with respect to FIG. 1A). According to embodiments, the server 310 may support a website (e.g., a digital design website and/or a product design website) or an application that is accessible by the client device 305 via a network connection, where a user of the client device 305 may use the client device 305 to make selections associated with the website.

The server 310 may connect to and interface with the data source(s) 315 via an application programming interface (API) or other interface. In an implementation, the data source(s) 315 may be embodied within or separate from the server 310. For example, the data source(s) 315 may be part of a social networking service that may connect to the server 310 via a network connection. According to embodiments, users and entities may have accounts associated with the data source(s) 315 (e.g., a business may have an account and profile with a social networking service).

It should be appreciated that the functionalities performed by the various components are exemplary, and that additional or alternative functionalities are envisioned. Further, although FIG. 3 depicts certain functionalities being performed by certain of the components, it should be appreciated that another of the components may perform the certain functionalities. For example, some of the analysis and determination functionalities as depicted as being performed by the server 310 may additionally or alternatively be performed by the client device 305 (e.g., by an application executing on the client device 305).

The signal diagram 300 may begin when the client device 305 retrieves (320), from the server 310, a first template (e.g., first template 151a) and a second template (e.g., second template 151b). In embodiments, the client device 305 may access the website supported by the server 310, and a user of the client device 305 may use the client device 305 to make certain selections associated with retrieving the first template and second template. For example, the user may select to view templates associated with a restaurant business (i.e., a category of templates). As another example, a default first template and a default second template may be retrieved from the server 310. It should be appreciated that different templates may be associated with different businesses, uses, products, categories, and/or the like, where the website may organize or categorize the templates accordingly. In addition, although the example of FIG. 3 is illustrated with respect to two templates (i.e., the first template and the second template), it should be understood that any number of templates may be used.

After retrieving the first template and the second template, the client device 305 may display (322) the first and second templates for review by the user. In embodiments, the user may use the client device 305 to make certain selections associated with the first and second templates, such as to view certain details of the first and second templates, zoom in or out, and view different angles or sides of the first and second templates. Each of the first and second templates may include a default image and/or a set of default design elements. In particular, the default image may be a background image or pattern, a stock image, or the like; and the set of default design elements may include certain stock or default designs, motifs, logos, representations, textual content, and/or the like.

The client device 305 may receive (324), via a user interface of the client device 305, a search term(s) and optionally content that may be associated with a modification or redesign of the first and second templates. In embodiments, the search term(s) and/or content may be associated with a desired modification to one or more of the first and second templates. For example, the user may input the search term "Fiona's Florist" to match a business having the same name. Additionally, the content may be visual and/or textual content that the user may wish to include in the digital design. For example, a user may input their name to be included on a business card for "Fiona's Florist." A user may input the search term(s) and the content via an appropriate interface(s) of the website, and may use various input channels or techniques (e.g., voice input, mouse/keyboard input, predictive terms, etc.). It should be appreciated that the client device 305 may receive, via the user interface, various amounts of search terms and items of content. It should be further appreciated that the client device 305 may receive a combination of both the search term(s) and content.

The client device 305 may provide (326) the search terms(s) and optionally the content to the server 310 via the network connection, such as in response to the client device 305 receiving, via the user interface, a "search" selection (or similar selection) made by the user of the client device 305. The server 310 may retrieve (328), from the data source(s) 315, visual and textual content according to at least the search term(s). In particular, the server 310 may query (e.g., via an API) the data source(s) with the search term(s) to identify or determine a profile or account that matches the query, where the profile or account may include textual content such as phone number, address, contact name(s), email address, and/or the like, and/or visual content such as images, logos, motifs, color(s), and/or the like. For example, the data source(s) 315 may be associated with a social networking service, and there may be a profile or account for a business with the name "Fiona's Florist," where the profile may include a phone number, address, and logo. It should be appreciated that various amounts of representative visual and/or textual content may be retrieved from the source(s) 315.

The server 310 may retrieve (330) an identification confirmation from the client device 305. In particular, the server 310 may provide at least a portion of the visual and textual content retrieved in (328) to the client device 305, which may present the portion of the content for review by the user. In certain scenarios, the server 310 may provide content associated with multiple profiles or accounts that match the query. The user may use the client device 305 to confirm or select a desired profile or account, which the client device 305 may relay to the server 310. According to embodiments, the user may also use the client device 305 to make certain selections associated with the content, such as "favoriting" or removing certain content, viewing additional details associated with certain content, facilitating an additional search for additional content based on the same or additional search term(s), and or other functionalities.

The server 310 (or in some cases, an application executing on the client device 305) may analyze and optionally modify (332) any portion of the visual and/or textual content. In an embodiment, the server 310 may analyze an image to determine a dominant or prominent color that exists in the image (and optionally determine a color palette from the image, where the color palette may include two or more prominent colors). As used herein, a dominant color of an image is the color (or color shade) that is most prominent in an image, where the server 310 may determine the dominant color (or color palette) using various techniques, calculations, or by interfacing with a third party service.

Additionally or alternatively, the server 310 may analyze an image to determine various metrics associated with the image, such as contrast level, brightness, hue, saturation, intensity, RGB color makeup, and/or others. Additionally or alternatively, the server 310 may compare a contrast level of the image and/or design elements to a contrast level of the content provided to the server 310 in (326), and may determine whether to modify the content. In particular, the server 310 may determine whether a difference in contrast levels meets or exceeds a threshold level, and if so, may determine to apply a formatting (e.g., bold) to the content in an effort to increase the visibility and legibility of the content. It should be appreciated that other image analysis techniques and calculations are envisioned.

The server 310 (or in some cases, an application executing on the client device 305) may modify (334) at least a portion of the templates according to the analysis and modification of (332). In embodiments, the server 310 may determine which portion of the templates to modify based on a category of the selected profile or account. For example, if the selected profile or account is associated with a painting business, the server 310 may determine to display and modify templates that match a painting category.

In modifying at least the portion of the templates, the server may modify certain default content with textual or visual content associated with the selected profile or account. For example, the server 310 may replace a stock background image with a profile image associated with the selected profile or account. Another of the modifications of the template may be to replace at least a portion of the set of default design elements with at least a portion of the textual and/or visual content retrieved from the data source(s) 315. For example, the server 310 may replace a circle icon with a logo of a painting business. An additional of the modifications of the template may be to apply the determined dominant color of an image to a retrieved image (e.g., as a hue) and/or to at least a portion of the retrieved visual content (e.g., as a hue). For example, if the dominant color of a profile image of a painting business is blue, then the server 310 may apply a blue hue to the image and to a logo of a paint can.

The server 310 may also compare metrics associated with the content provided in (326) to metrics associated with any content retrieved from the data source(s) 315. In particular, the server 310 may compare the contrast level of the content to the contrast level of an image to determine if a threshold is met or exceeded. If the threshold is met or exceeded (i.e., the difference in contrast levels is sufficient), the server 310 may refrain from modifying the content. Conversely, if the threshold is not met or exceeded (i.e., the difference in contrast levels is smaller), the server 310 may determine to modify the content. In particular, if the content is textual content, the server 310 may apply a bold formatting to the text, adjust the color or contrast of the text, or facilitate another modification.

The server 310 may provide (336) information associated with modification of the templates and content to the client device 305. After receiving the information, the client device 305 may display (338) the templates according to the received modification information. In particular, the client device 305 may display, for each template, any default content replaced with at least a portion of the visual and/or textual content retrieved in (328), and/or the determined dominant color of an image applied to the image (e.g., as a hue) and/or to at least a portion of the retrieve content (e.g., as a hue). Additionally or alternatively, the client device 305 may display, for each template, any content received in (324), where the content may or may not be modified based on the analysis/modification of (332).

The client device 305 may further receive (342) a set of user selections associated with the displayed content and/or functionality related thereto. For example, the website or application may support users ordering digital designs according to the displayed templates, where the users may select a template from which to order a digital design, a desired size and quantity of the digital design, delivery information (e.g., to an email address, online account, etc.), payment information, and/or other selections. The client device 305 may further facilitate (342) a digital design order with the server 310. In particular, the client device 305 may transmit selections associated with the digital design order to the server 310, and the server 310 may facilitate an order of the digital design according to the selections. For example, the server 310 may post the ordered digital design to the user's online account (e.g., by sending the digital design directly to the server of an online service, such as the online service server(s) 170 of FIG. 1B).

Figure 4A:
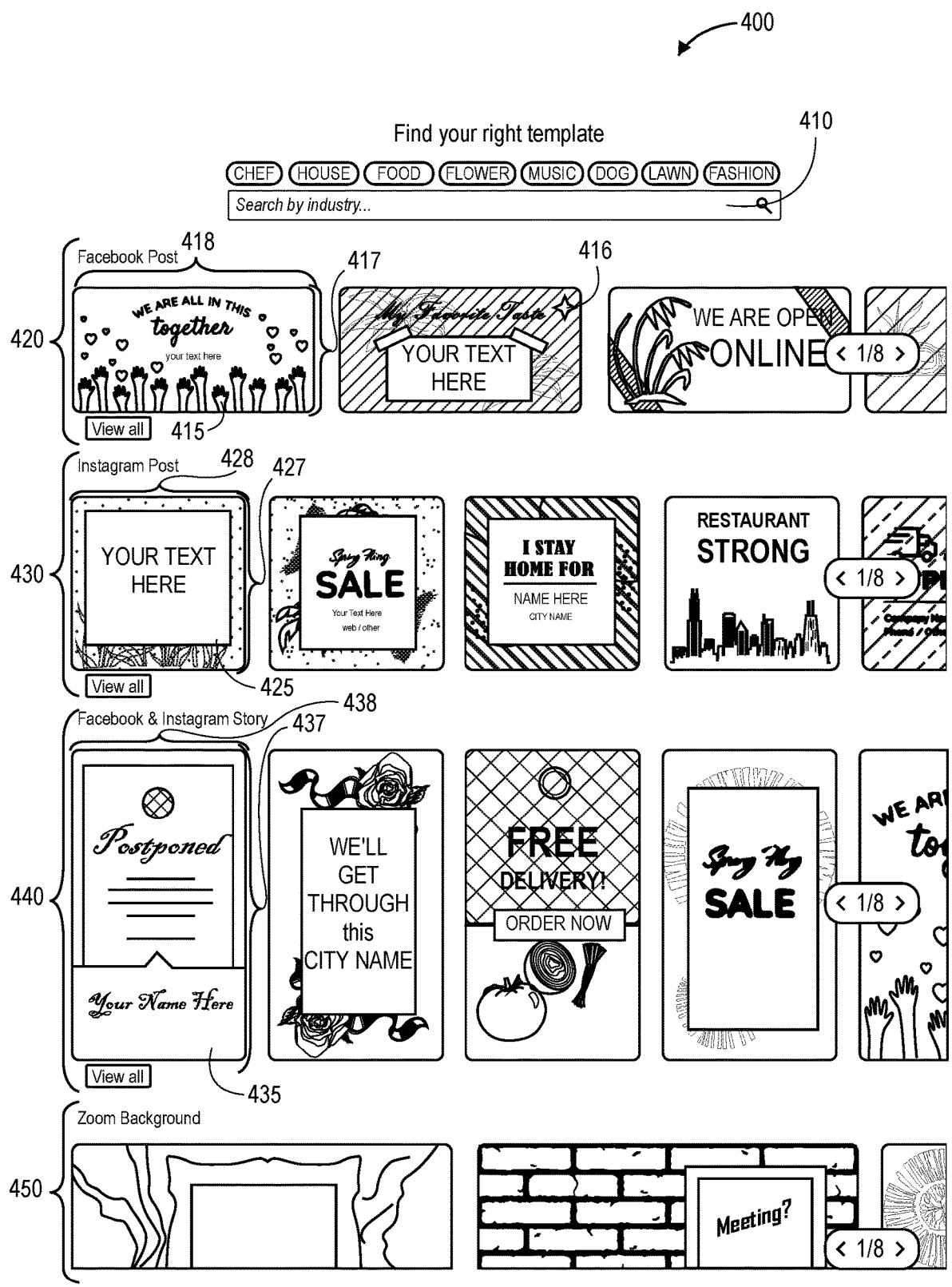
FIG. 4A illustrates an example interface displaying default templates.

FIGS. 4A-4D illustrate examples of creating digital designs in accordance with the techniques discussed herein. FIG. 4A illustrates an example interface 400 for displaying default templates, such as the first template 151a and second template 151b of FIG. 1B. The interface 400 may include a input area 410 into or via which a user may input one or more search terms (e.g., textual input, speech-to-text input, etc.). In the example of FIG. 4A, no search term has yet been entered, and thus, unmodified templates (e.g., 151a, 151b of FIG. 1B) are shown.

With further reference to the example of FIG. 4A, a first template 415 (e.g., the first template 151a) is shown in a first row 420. In some implementations, the first row 420 corresponds to a first online account (e.g., a social media service such as FACEBOOK). Put another way, in some implementations, multiple templates (including the first template 151a) corresponding to the first online service are all displayed in the first row 420.

A second template 425 (e.g., the second template 152a) is shown in a second row 430. In some implementations, the second row 430 corresponds to a second online service (e.g., a second social media service such as INSTAGRAM). Put another way, in some implementations, multiple templates (including the second template 152a) corresponding to the second online service are all displayed in the second row 430.

Likewise, as illustrated, the third row 440, and the fourth row 450 also display templates for the user to select from. In the illustrated example, the third row 440 includes templates (including third template 435) corresponding to a story for both the first and second online services. Further in the illustrated example, the fourth row 450 includes templates for an online video conferencing and/or meeting site.

The first template 415 has a first set of dimensions; namely, a first height 417, and a first width 418. The second template 425 has a second set of dimensions; namely, a second height 427, and a second width 428. The third template 435 has a third set of dimensions; namely, a third height 437, and a third width 438. In the illustrated example, the first, second, and third sets of dimensions are all different. For instance, the first width 418 is different than the second width 428 is different than the third width 438. For example, the first width 418 is greater than the second width 428. This difference in dimensions allows for the digital designs to be specifically tailored for each online service, or for each intended purpose (e.g., a story posted to multiple online services).

The illustrated example of FIG. 4A further includes default design element 416 (illustrated as an icon), which will be discussed in following sections of this disclosure.

Figure 4B:
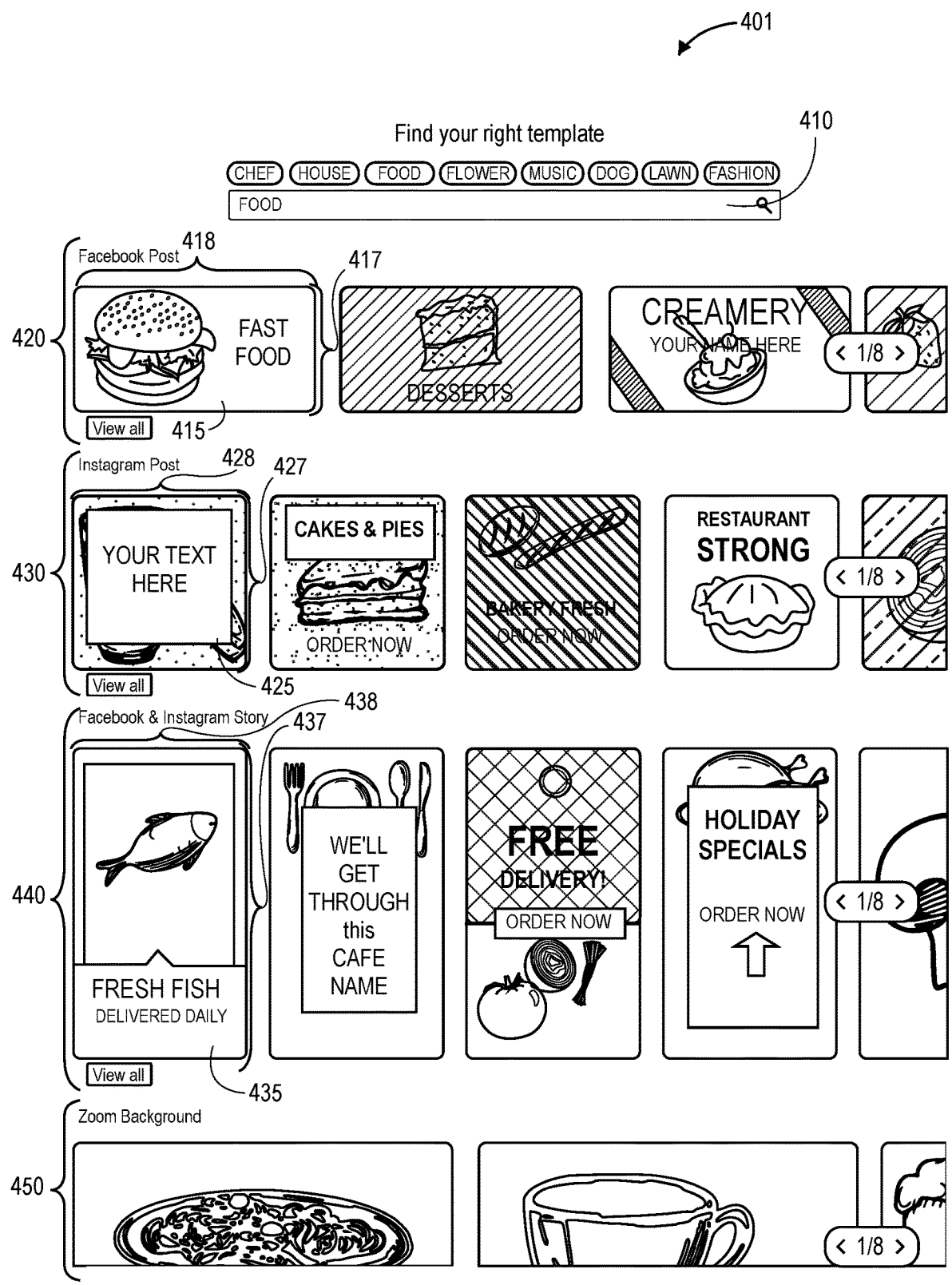
FIG. 4B illustrates an example interface displaying modified templates that have been modified by the search term "food."

FIG. 4B illustrates an example interface 401 displaying modified templates, such as the first modified template 152a and modified second template 152b of FIG. 1B, when a search term of "food" has been entered into input box 410. In particular, the templates illustrated in the example of FIG. 4A have been modified based on the search term "food."

For example, in accordance with the techniques described herein, the system (e.g., the central server 110) may receive the search term of "food" from the user (e.g., from one of the electronic devices 103, 104, 105). The system then queries the data source(s) 116 for food to retrieve image(s) of food. The system then superimposes or inserts the retrieved image(s) of food onto the templates (e.g., of FIG. 4A) to create the modified templates (e.g., of FIG. 4B).

Figure 4C:
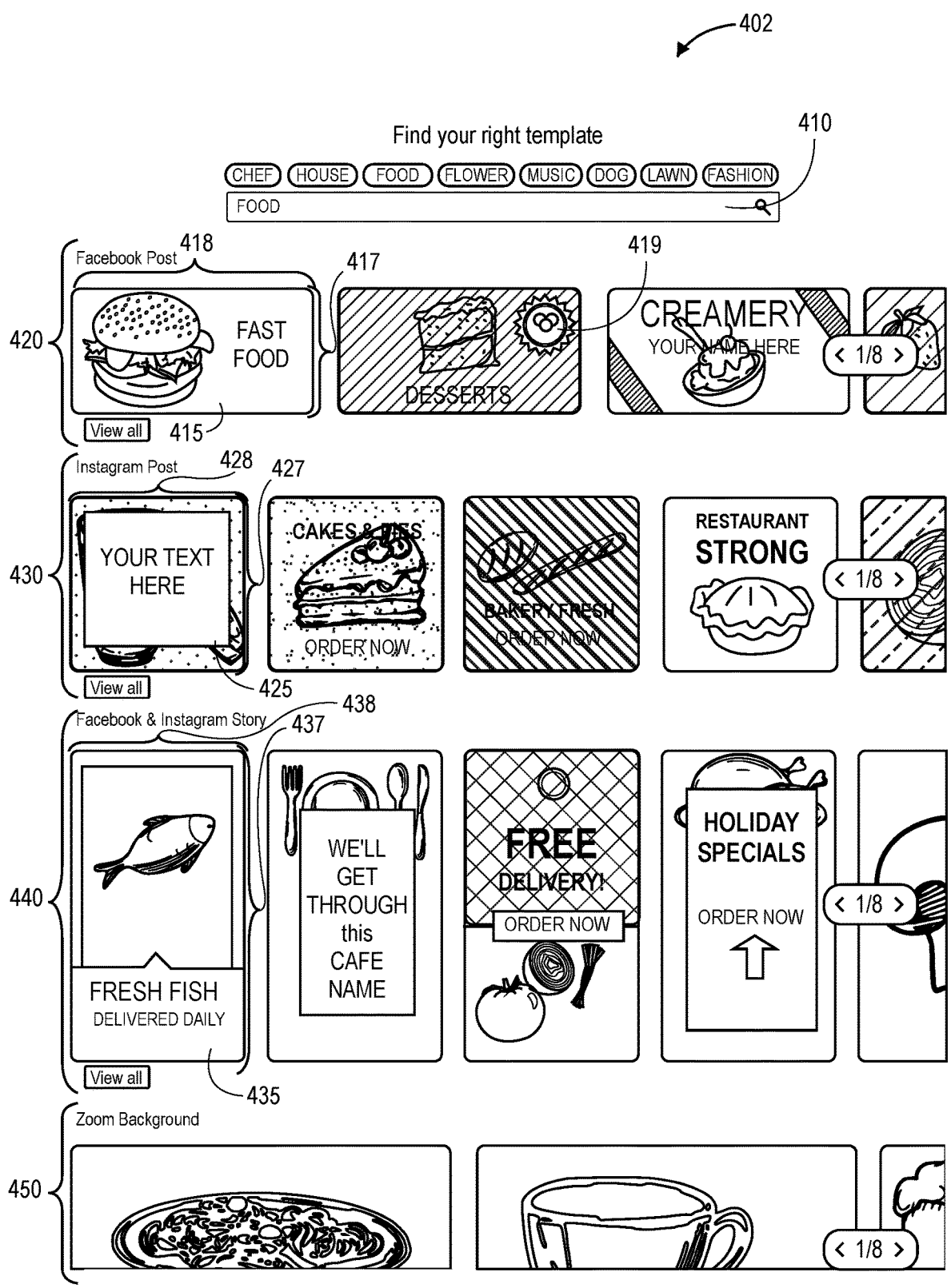
FIG. 4C illustrates an example interface displaying modified templates that have been modified by a design element.

FIG. 4C illustrates an example interface 402 displaying modified templates, such as the first modified template 152a and modified second template 152b of FIG. 4B, based upon a design element. In particular, the design element of the example of FIG. 4C comprises a business logo.

For example, in accordance with the techniques described herein, the system may receive (e.g., by upload, email, etc.) a business logo 419 from the user. The system may then superimpose or insert the business logo 419 onto a default template to create a modified template. For example, the default design element 416 of FIG. 4A may be replaced by the business logo 419 from the user.

Figure 4D:
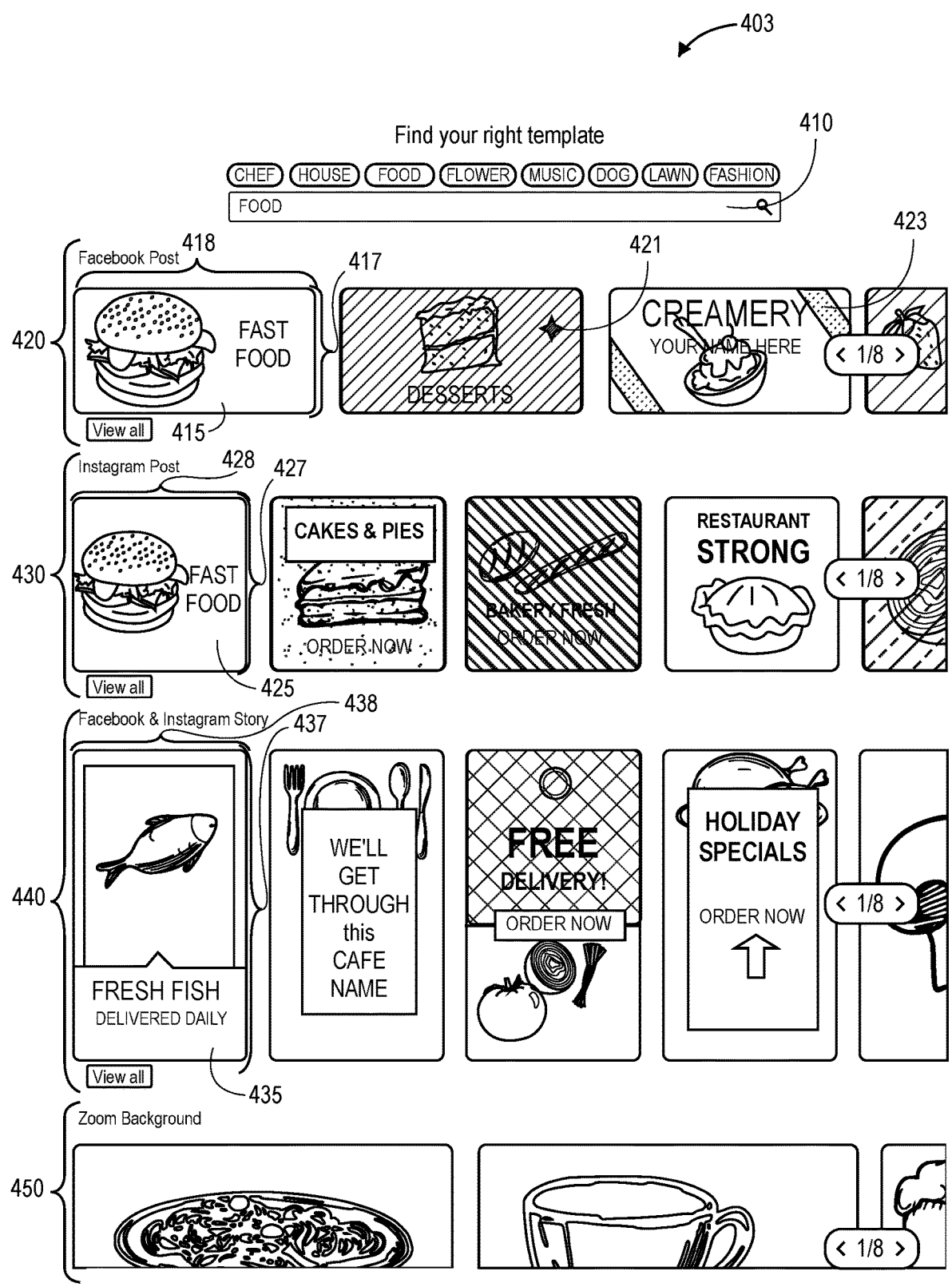
FIG. 4D illustrates an example interface displaying modified templates that have been modified based upon a color.

FIG. 4D illustrates an example interface 403 for displaying modified templates, such as the first modified template 152a and modified second template 152b of FIG. 1B, based upon a color. For example the system may determine a color(s) or dominant color(s) in an image from data source(s) 116, and then modify the template(s) based upon the color(s) or dominant color(s). In another example, the system may receive a selection of a color(s) from the user, and modify the template(s) based upon the selected color(s).

In this regard, the system may replace a color of a default design element 416 of FIG. 4A with a different icon including the determine color(s), determined dominant color(s), or user selected color(s). An example of this is illustrated by the design element 421 of FIG. 4D, which was created by changing a color of the default design element 416. Additionally or alternatively, the system may apply the determine color(s), determined dominant color(s), or user selected color(s) to the image from the data source(s) 116 and/or default template when inserting or superimposing the image onto the default template. An example of this is illustrated by ribbon portion 423. More specifically, in this example, a color of a default design template was changed in ribbon portion 423; for instance, if a default template appears with the colors as in FIG. 4B or 4C, FIG. 4D illustrates an example where the color of the ribbon portion 423 was changed by lightening the color.

FIG. 4D illustrates a further aspect as well. Specifically, in some embodiments, a modified template (e.g., the first modified template 415) for a first online account may be the same or similar to a modified template (e.g., the second modified template 425) for a second online account, except for the dimensions. For instance, in the example of FIG. 4D, the first modified template 415 includes the same image, design elements, and colors as the second modified template 425; but the first modified template 418 has a longer width and a shorter height than the second modified template 425. In this regard, the system improves efficiency because it allows for creation of digital designs with the same or similar look and feel that may be posted to multiple online services.

FIG. 5 depicts a block diagram of an example method 500 for automatically generating digital designs from templates. The method 500 may be facilitated by an electronic device (such as one of the electronic devices 103, 104, 105 as discussed with respect to FIG. 1A) that may be in communication with a server (such as the central server 110 as discussed with respect to FIG. 1A). In embodiments, the method 500 may be at least partially facilitated by a remote server, such as the central server 110 as discussed with respect to FIG. 1A.

The method 500 may begin when the electronic device displays (block 505), in a user interface, a first and second template for a digital design, where each of the first and second templates has (i) a default image, and (ii) a set of default design elements. In embodiments, the first and second template templates, the default image(s), and the set(s) of default design elements may be default and/or may be selected by a user. In addition, although the example of FIG. 5 is illustrated with respect to two templates (i.e., the first template and the second template), it should be understood that any number of templates may be used.

Furthermore, the first and second templates may have different formats, thereby allowing them to be specifically tailored to particular online services. For example, the dimensions (e.g., the height and width) of the templates may be different.

The electronic device may receive (block 510), via the user interface, at least one search term. In embodiments, the electronic device may receive the at least one search term via one or more data input channels. The electronic device may identify (block 515), based on the at least one search term, an image and a set of design elements. In embodiments, the electronic device may retrieve, from an image database (such as the data source(s) 215 of the example of FIG. 2) based on the at least one search term, the image and the set of design elements. In additional or alternative embodiments, the electronic device may receive, via the user interface, a set of inputs indicative of the set of (or a portion of the set of) design elements.

The electronic device may receive (block 520), via the user interface, a selection for at least a portion of the set of design elements. In particular, the electronic device may display, in the user interface, the set of design elements, and the user may select which of the set of design elements to include in a digital design. The electronic device may also determine (block 525) a dominant color of the image, or in some cases, multiple dominant colors.

The electronic device may also modify at least a portion of the first template and the second template. In particular, the electronic device may replace (block 530), in each of at least the portion of the first template and the second template, the default image with the image. Additionally or alternatively, the electronic device may replace (block 535), in each of at least the portion of the first template and the second template, at least a portion of the set of default design elements with at least the portion of the set of design elements (e.g., replacing a default design element comprising an icon with a design element comprising a business logo). Additionally or alternatively, the electronic device may replace a first font with a second font.

Additionally or alternatively, the electronic device may apply (block 540), in each of at least the portion of the first template and the second template, the dominant color of the image to at least one of the image and at least the portion of the set of design elements. The electronic device may present or display the modified set of templates for review by the user (e.g., as in the examples of FIGS. 4B-4D).

The electronic device may add (block 545) textual content to each of at least the portion of the set of templates. In embodiments, the electronic device may receive, via the user interface, textual content and add the textual content to each of at least the portion of the set of templates. The electronic device may perform certain analyses on the textual content. In particular, the electronic device may compare a contrast level of the textual content to a contrast level of the image with the dominant color applied thereto. Additionally, the electronic device may modify the textual content based on the comparing (e.g., bolding the textual content), and add the textual content that was modified to each of at least the portion of the set of templates.

The electronic device may display (block 550), on the user interface, the modified first template and the modified second template. In some embodiments, the displayed, modified templates are grouped together by categories. For instance, a first row of templates (e.g., including the first template) may correspond to a first online service; a second row (e.g., including the second template) may correspond to a second online service; a third row (e.g., including a third template) may correspond to both the first and second online services; and a fourth row (e.g., including a fourth template) may correspond, in particular, to an online conference site (e.g., the digital design is for a background for an online video conference).

Figure 6:
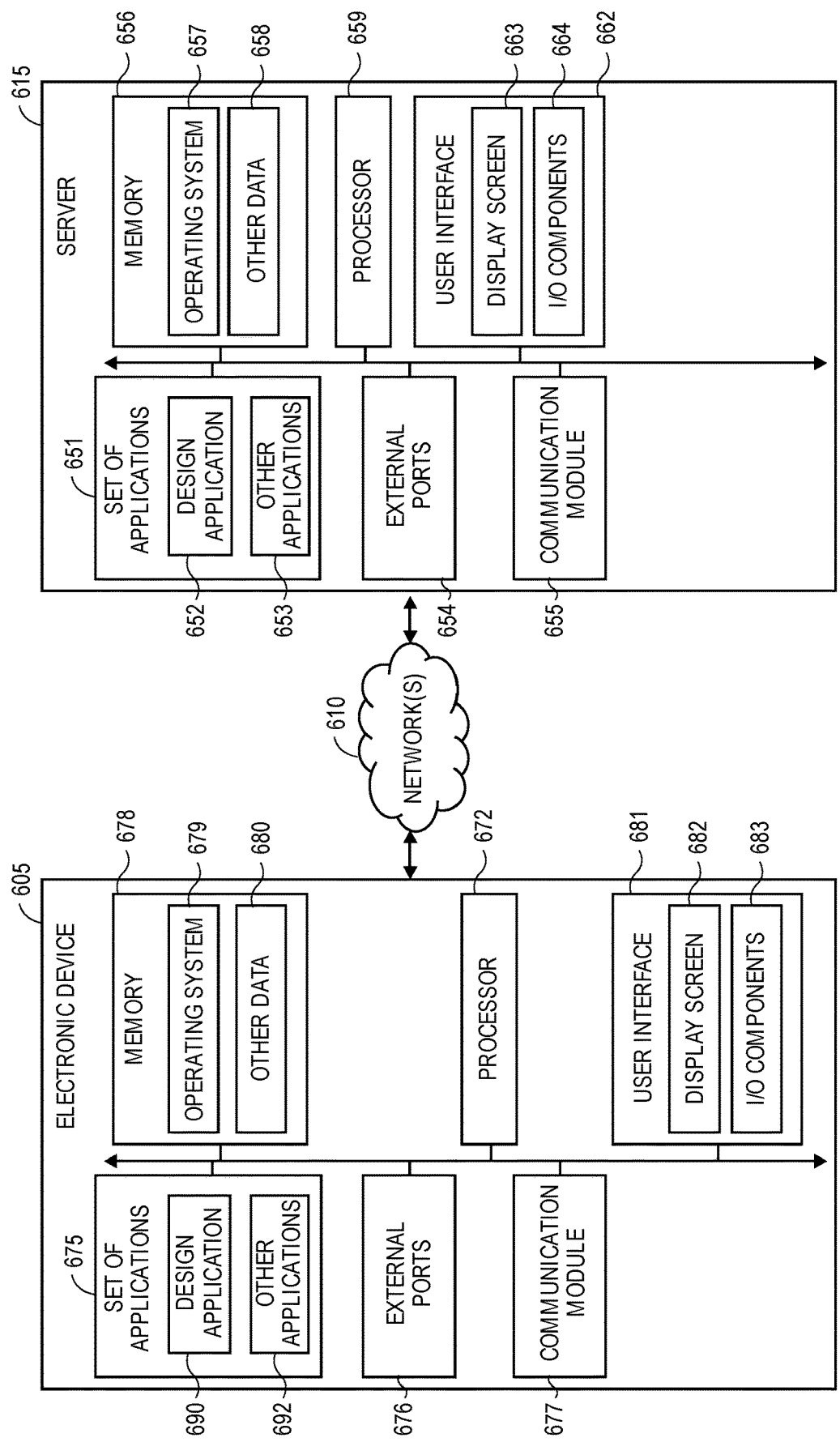
FIG. 6 is a block diagram of an example electronic device and an example server, in accordance with some embodiments.

FIG. 6 illustrates a hardware diagram of an example electronic device 605 (such as one of the electronic devices 103, 104, 105 as discussed with respect to FIG. 1A) and an example server 615 (such as the server computer 110 as discussed with respect to FIG. 1A), in which the functionalities as discussed herein may be implemented.

The electronic device 605 may include a processor 672 as well as a memory 678. The memory 678 may store an operating system 679 capable of facilitating the functionalities as discussed herein as well as a set of applications 675 (i.e., machine readable instructions). For example, one of the set of applications 675 may be a design application 690 (such as the digital design application 160 of FIG. 1B) configured to facilitate functionalities associated with creating and editing digital designs in various formats, as discussed herein. It should be appreciated that one or more other applications 692 are envisioned.

The processor 672 may interface with the memory 678 to execute the operating system 679 and the set of applications 675. According to some embodiments, the memory 678 may also include other data 680 including formatting data. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 605 may further include a communication module 677 configured to communicate data via one or more networks 610. According to some embodiments, the communication module 677 may include one or more transceivers (e.g., WWAN, WLAN, and/or WPAN transceivers) functioning in accordance with IEEE standards, 3GPP standards, or other standards, and configured to receive and transmit data via one or more external ports 676. For example, the communication module 677 may communicate with the server 615 via the network(s) 610.

The electronic device 605 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs). According to some embodiments, the user may access the electronic device 605 via the user interface 681 to review various designs and preview images, and make various selections.

In some embodiments, the electronic device 605 may perform the functionalities as discussed herein as part of a "cloud" network or may otherwise communicate with other hardware or software components within the cloud to send, retrieve, or otherwise analyze data.

As illustrated in FIG. 6, the electronic device 605 may communicate and interface with the server 615 via the network(s) 610. The server 615 may include a processor 659 as well as a memory 656. The memory 656 may store an operating system 657 capable of facilitating the functionalities as discussed herein as well as a set of applications 651 (i.e., machine readable instructions). For example, one of the set of applications 651 may be a design application 652 (such as the digital design application 160 of FIG. 1B) configured to facilitate functionalities associated with creating and editing digital designs in various formats, as discussed herein. It should be appreciated that one or more other applications 653 are envisioned.

The processor 659 may interface with the memory 656 to execute the operating system 657 and the set of applications 651. According to some embodiments, the memory 656 may also include other data 658, such data received from the electronic device 605 and/or other data. The memory 656 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 615 may further include a communication module 655 configured to communicate data via the one or more networks 610. According to some embodiments, the communication module 655 may include one or more transceivers (e.g., WWAN, WLAN, and/or WPAN transceivers) functioning in accordance with IEEE standards, 3GPP standards, or other standards, and configured to receive and transmit data via one or more external ports 654.

The server 615 may further include a user interface 662 configured to present information to a user and/or receive inputs from the user. As shown in FIG. 6, the user interface 662 may include a display screen 663 and I/O components 664 (e.g., ports, capacitive or resistive touch sensitive input panels, keys, buttons, lights, LEDs). According to some embodiments, the user may access the server 615 via the user interface 662 to review information, make selections, and/or perform other functions.

In some embodiments, the server 615 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 672, 659 (e.g., working in connection with the respective operating systems 679, 657) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

ASPECTS

Aspect 1. A computer-implemented method of automatically generating digital designs, the method comprising:
displaying, in a user interface: (i) a first template for a digital design, the first template associated with a first online account, and (ii) a second template for the digital design, the second template associated with a second online account, wherein each of the first template and the second template comprises (i) a default image, and (ii) a set of default design elements, and wherein the first template has a first format and the second template has a second format different than the first format;
receiving, by a computer processor via the user interface, a search term;
identifying, based on the search term, an image and a set of design elements; and
modifying the first template and the second template displayed in the user interface by replacing, in each of first template and the second template, at least one of (i) the default image with the image, or (ii) at least a portion of the set of default design elements with at least a portion of the set of design elements.

Aspect 2. The computer-implemented method of aspect 1, further comprising:
determining, by the computer processor, a color of the image; and
wherein the modifying further comprises applying, in each of the first template and the second template, the color of the image to at least one of the image and at least the portion of the set of design elements.

Aspect 3. The computer-implemented method of aspect 1, wherein:
the first format specifies a first set of dimensions;
the second format specifies a second set of dimensions; and
the first set of dimensions is different than the second set of dimensions.

Aspect 4. The computer-implemented method of aspect 3, wherein:
the first set of dimensions has a first height and a first width;
the second set of dimensions has a second height and a second width;
the first height is greater than the second height; and
the first width is greater than the second width.

Aspect 5. The computer-implemented method of aspect 1, wherein:
the digital design of the first template is for a social media site; and
the digital design of the second template is for an online conference site.

Aspect 6. The computer-implemented method of aspect 1, wherein the modifying comprises replacing, in each of first template and the second template, both of (i) the default image with the image, and (ii) at least the portion of the set of default design elements with at least the portion of the set of design elements.

Aspect 7. The computer-implemented method of aspect 1, wherein:
the modifying comprises replacing, in each of first template and the second template, at least the portion of the set of default design elements with at least the portion of the set of design elements;
at least the portion of the set of default design elements comprises a default icon; and
at least the portion of the set of design elements comprises a business logo.

Aspect 8. The computer-implemented method of aspect 1, wherein the modifying further comprises replacing, in each of first template and the second template, a first font with a second font.

Aspect 9. The computer-implemented method of aspect 1, further comprising:

displaying, in the user interface: (iii) a third template for the digital design, the third template associated with both the first online account, and the second online account, wherein the third template comprises (i) a default image of the third template, and (ii) a set of default design elements of the third template, wherein the third template has a third format, and wherein the third format is different from both the first format and the second format;

modifying the third template displayed in the user interface by replacing, in the third template, at least one of (i) the default image of the third template with the image, or (ii) at least a portion of the set of default design elements of the third template with at least a portion of the set of design elements;

displaying, in a first area of the user interface, the first modified template along with at least one other template corresponding to the first online account;

displaying, in a second area of the user interface, the second modified template along with at least one other template corresponding to the second online account; and displaying, in a third area of the user interface, the third modified template along with at least one other template corresponding to both the first online account, and the second online account.

Aspect 10. The computer-implemented method of aspect 1, further comprising:

displaying, in the user interface, the set of design elements; and receiving, via the user interface, a selection for at least the portion of the set of design elements.

Aspect 11. The computer-implemented method of aspect 1, further comprising:

determining, by the computer processor, a color of the image;

wherein the modifying further comprises applying, in each of the first template and the second template, the color of the image to at least one of the image and at least the portion of the set of design elements; and wherein the computer-implemented method further comprises:
identifying textual content to add to each of the first template and the second template;
comparing a contrast level of the textual content to a contrast level of the image with the color applied thereto;
based on the comparing, modifying the textual content; and
adding the textual content that was modified to each of at least a portion of the first template and at least a portion of the second template.

Aspect 12. The computer-implemented method of aspect 1, wherein:

the modifying comprises replacing, in each of first template and the second template, at least a portion of the set of default design elements with at least the portion of the set of design elements; and at least one of the set of default design elements in each of at least the portion of the first template and at least the portion of the second template is not replaced with at least one of the set of design elements.

Aspect 13. A system for automatically generating digital designs, comprising:

a user interface for displaying content;

a memory storing non-transitory computer executable instructions; and a processor interfacing with the user interface and the memory, wherein the processor is configured to execute the non-transitory computer executable instructions to cause the processor to:
cause the user interface to display (i) a first template for a digital design, the first template associated with a first online account, and (ii) a second template for the digital design, the second template associated with a second online account, wherein each of the first template and the second template comprises (i) a default image, and (ii) a set of default design elements, and wherein the first template has a first format and the second template has a second format different than the first format;
receive, via a user interface, at least one search term;
identify, based on the at least one search term, an image and a set of design elements; and
cause the user interface to modify the first template and the second template displayed in the user interface by replacing, in each of first template and the second template, at least one of (i) the default image with the image, or (ii) at least a portion of the set of default design elements with at least a portion of the set of design elements.

Aspect 14. The system of aspect 13, wherein the processor is further configured to:

determine a color of the image; and wherein to cause the user interface to modify the first template and the second template, the processor is configured to apply, in each of the first template and the second template, the color of the image to at least one of the image and at least the portion of the set of design elements.

Aspect 15. The system of aspect 13, wherein:

the first format specifies a first set of dimensions;

the second format specifies a second set of dimensions; and the first set of dimensions is different than the second set of dimensions.

Aspect 16. The system of aspect 13, wherein:

the digital design of the first template is for a social media site; and the digital design of the second template is for an online conference site.

Aspect 17. A non-transitory computer-readable storage medium configured to store instructions, the instructions, when executed by a processor, cause the processor to perform operations comprising:

displaying, in a user interface: (i) a first template for a digital design, the first template associated with a first online account, and (ii) a second template for the digital design, the second template associated with a second online account, wherein each of the first template and the second template comprises (i) a default image, and (ii) a set of default design elements, and wherein the first template has a first format and the second template has a second format different than the first format;

receiving a search term;

identifying, based on the search term, an image and a set of design elements; and modifying the first template and the second template displayed in the user interface by replacing, in each of first template and the second template, at least one of (i) the default image with the image, or (ii) at least a portion of the set of default design elements with at least a portion of the set of design elements.

Aspect 18. The non-transitory computer-readable storage medium of aspect 17, wherein the operations further comprise:

determining a color of the image; and wherein the modifying further comprises applying, in each of the first template and the second template, the color of the image to at least one of the image and at least the portion of the set of design elements.

Aspect 19. The non-transitory computer-readable storage medium of aspect 17, wherein:

the first format specifies a first set of dimensions;

the second format specifies a second set of dimensions; and the first set of dimensions is different than the second set of dimensions.

Aspect 20. The non-transitory computer-readable storage medium of aspect 17, wherein:

the digital design of the first template is for a social media site; and the digital design of the second template is for an online conference site.

Other Matters

Although this text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method of automatically generating digital designs, the method comprising:
    displaying, in a user interface: (i) a first template for a digital design, the first template associated with a first online account, and (ii) a second template for the digital design, the second template associated with a second online account, wherein each of the first template and the second template comprises (i) a default image, and (ii) a set of default design elements, and wherein the first template has a first format and the second template has a second format different than the first format;
    receiving, by a computer processor via the user interface, a single search term;
    identifying, based on the single search term, both: (i) an image and (ii) a set of design elements to be used to modify the first template and the second template with; and
    modifying the first template and the second template displayed in the user interface by replacing, in each of the first template and the second template, at least one of (i) the default image with the image, and (ii) at least a portion of the set of default design elements with at least a portion of the set of design elements.

2. The computer-implemented method of claim 1, further comprising:
    determining, by the computer processor, a color of the image; and
    wherein the modifying further comprises applying, in each of the first template and the second template, the color of the image to at least one of the image and at least the portion of the set of design elements.

3. The computer-implemented method of claim 1, wherein:
    the first format specifies a first set of dimensions;
    the second format specifies a second set of dimensions; and
    the first set of dimensions is different than the second set of dimensions.

4. The computer-implemented method of claim 3, wherein:
    the first set of dimensions has a first height and a first width;
    the second set of dimensions has a second height and a second width;
    the first height is greater than the second height; and
    the first width is greater than the second width.

5. The computer-implemented method of claim 1, wherein:
    the digital design of the first template is for a social media site; and
    the digital design of the second template is for an online conference site.

6. The computer-implemented method of claim 1, wherein the modifying comprises replacing, in each of the first template and the second template, both of (i) the default image with the image, and (ii) at least the portion of the set of default design elements with at least the portion of the set of design elements.

7. The computer-implemented method of claim 1, wherein:
    the modifying comprises replacing, in each of the first template and the second template, at least the portion of the set of default design elements with at least the portion of the set of design elements;
    at least the portion of the set of default design elements comprises a default icon; and
    at least the portion of the set of design elements comprises a business logo.

8. The computer-implemented method of claim 1, wherein the modifying further comprises replacing, in each of the first template and the second template, a first font with a second font.

9. The computer-implemented method of claim 1, further comprising:
    displaying, in the user interface: (iii) a third template for the digital design, the third template associated with both the first online account, and the second online account, wherein the third template comprises (i) a default image of the third template, and (ii) a set of default design elements of the third template, wherein the third template has a third format, and wherein the third format is different from both the first format and the second format;
modifying the third template displayed in the user interface by replacing, in the third template, at least one of (i) the default image of the third template with the image, or (ii) at least a portion of the set of default design elements of the third template with at least a portion of the set of design elements;
displaying, in a first area of the user interface, the first modified template along with at least one other template corresponding to the first online account;
displaying, in a second area of the user interface, the second modified template along with at least one other template corresponding to the second online account; and
displaying, in a third area of the user interface, the third modified template along with at least one other template corresponding to both the first online account, and the second online account.

10. The computer-implemented method of claim 1, further comprising:
displaying, in the user interface, the set of design elements; and
receiving, via the user interface, a selection for at least the portion of the set of design elements.

11. The computer-implemented method of claim 1, further comprising:
determining, by the computer processor, a color of the image;
wherein the modifying further comprises applying, in each of the first template and the second template, the color of the image to at least one of the image and at least the portion of the set of design elements; and
wherein the computer-implemented method further comprises:
identifying textual content to add to each of the first template and the second template;
comparing a contrast level of the textual content to a contrast level of the image with the color applied thereto;
based on the comparing, modifying the textual content; and
adding the textual content that was modified to each of at least a portion of the first template and at least a portion of the second template.

12. The computer-implemented method of claim 1, wherein:
the modifying comprises replacing, in each of the first template and the second template, at least a portion of the set of default design elements with at least the portion of the set of design elements; and
at least one of the set of default design elements in each of at least the portion of the first template and at least the portion of the second template is not replaced with at least one of the set of design elements.

13. A system for automatically generating digital designs, comprising:
a user interface for displaying content;
a memory storing non-transitory computer executable instructions; and
a processor interfacing with the user interface and the memory, wherein the processor is configured to execute the non-transitory computer executable instructions to cause the processor to:
cause the user interface to display (i) a first template for a digital design, the first template associated with a first online account, and (ii) a second template for the digital design, the second template associated with a second online account, wherein each of the first template and the second template comprises (i) a default image, and (ii) a set of default design elements, and wherein the first template has a first format and the second template has a second format different than the first format;
receive, via a user interface, a single search term;
identify, based on the single search term, both: (i) an image and (ii) a set of design elements to be used to modify the first template and the second template with; and
cause the user interface to modify the first template and the second template displayed in the user interface by replacing, in each of the first template and the second template, at least one of (i) the default image with the image, and (ii) at least a portion of the set of default design elements with at least a portion of the set of design elements.

14. The system of claim 13, wherein the processor is further configured to:
determine a color of the image; and
wherein to cause the user interface to modify the first template and the second template, the processor is configured to apply, in each of the first template and the second template, the color of the image to at least one of the image and at least the portion of the set of design elements.

15. The system of claim 13, wherein:
the first format specifies a first set of dimensions;
the second format specifies a second set of dimensions; and
the first set of dimensions is different than the second set of dimensions.

16. The system of claim 13, wherein:
the digital design of the first template is for a social media site; and
the digital design of the second template is for an online conference site.

17. A non-transitory computer-readable storage medium configured to store instructions, the instructions, when executed by a processor, cause the processor to perform operations comprising:
displaying, in a user interface: (i) a first template for a digital design, the first template associated with a first online account, and (ii) a second template for the digital design, the second template associated with a second online account, wherein each of the first template and the second template comprises (i) a default image, and (ii) a set of default design elements, and wherein the first template has a first format and the second template has a second format different than the first format;
receiving a single search term;
identifying, based on the single search term, both: (i) an image and (ii) a set of design elements to be used to modify the first template and the second template with; and
modifying the first template and the second template displayed in the user interface by replacing, in each of the first template and the second template, at least one of (i) the default image with the image, and (ii) at least a portion of the set of default design elements with at least a portion of the set of design elements.

18. The non-transitory computer-readable storage medium of claim 17, wherein the operations further comprise:
 determining a color of the image; and
 wherein the modifying further comprises applying, in each of the first template and the second template, the color of the image to at least one of the image and at least the portion of the set of design elements.

19. The non-transitory computer-readable storage medium of claim 17, wherein:
 the first format specifies a first set of dimensions;
 the second format specifies a second set of dimensions; and
 the first set of dimensions is different than the second set of dimensions.

20. The non-transitory computer-readable storage medium of claim 17, wherein:
 the digital design of the first template is for a social media site; and
 the digital design of the second template is for an online conference site.

\* \* \* \* \*